United States Patent [19]
Den Berg et al.

[11] 3,798,703
[45] Mar. 26, 1974

[54] WINDSHIELD WIPER ASSEMBLY

[75] Inventors: J. Hans Van Den Berg; Alex Herman A. M. Van Fekelen, both of Hasselt, Belgium

[73] Assignee: Monroe Belgium N.V., Sint-Truiden, Belgium

[22] Filed: May 4, 1972

[21] Appl. No.: 250,339

[52] U.S. Cl. ............................................ 15/250.42
[51] Int. Cl. .............................................. B60s 1/04
[58] Field of Search.................... 15/250.36, 250.42

[56] References Cited
UNITED STATES PATENTS
3,021,549  2/1962  O'Shei ............................ 15/250.42
3,408,680  11/1968  Heller ............................. 15/250.42

*Primary Examiner*—Peter Feldman
*Attorney, Agent, or Firm*—Harness, Dickey & Pierce

[57] ABSTRACT

A windshield wiper assembly adapted for operative association with a wiper superstructure including a claw-like attachment link for operatively supporting the assembly; the assembly including an elongated wiper blade and a flexor element extending longitudinally of the blade and fixedly secured thereto, the attachment link normally being engaged with the flexor element at a first longitudinal position thereon and being movable longitudinally of the flexor element to a second position which permits disassembly of the blade assembly from the connecting link, and means including a resilient deformable element normally resisting longitudinal movement of said connecting link relative to said blade assembly.

14 Claims, 6 Drawing Figures

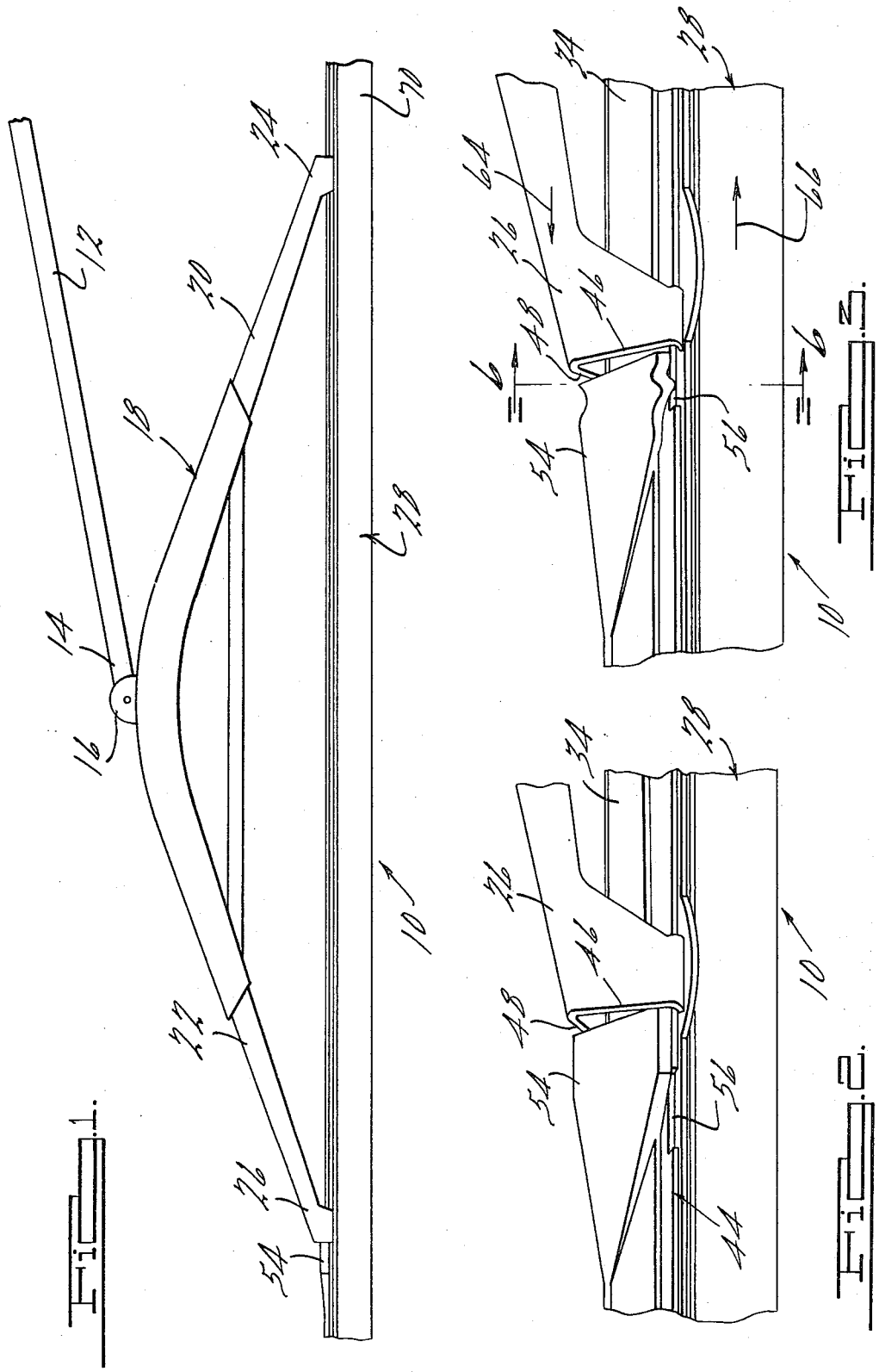

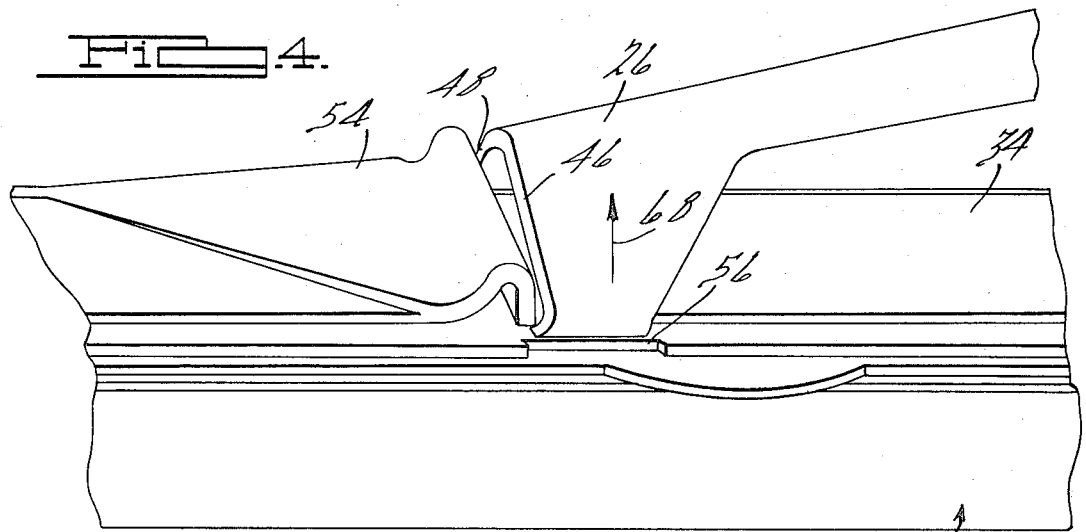
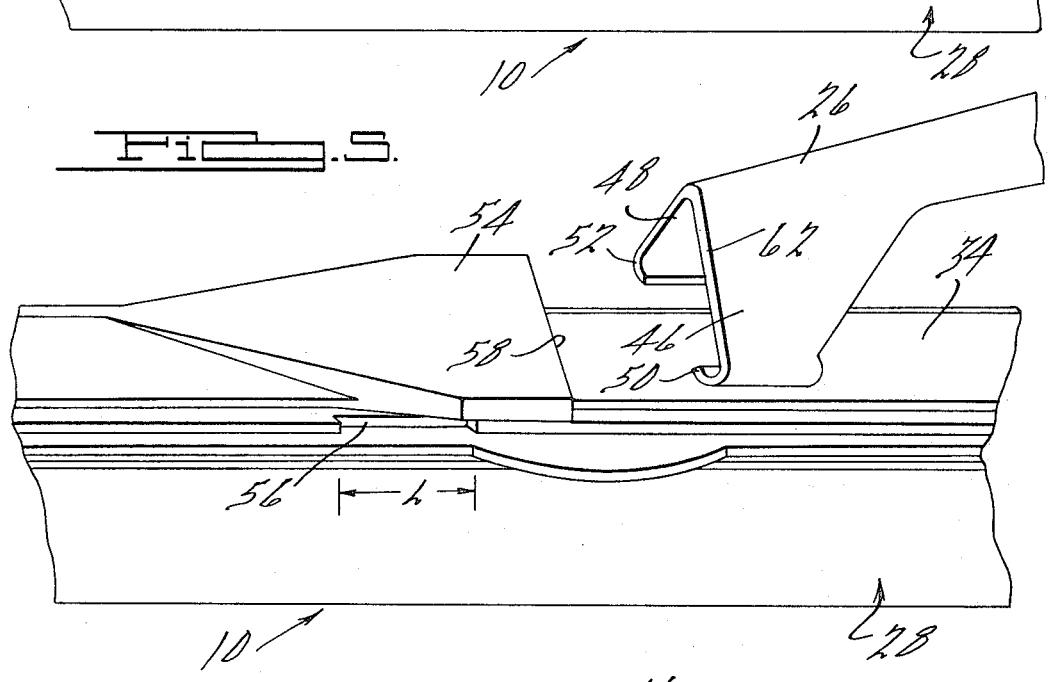
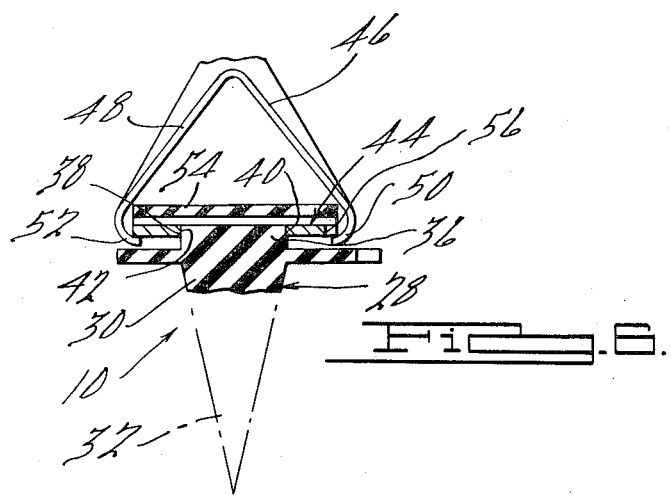

3,798,703

WINDSHIELD WIPER ASSEMBLY

SUMMARY OF THE INVENTION

Generally speaking, the present invention relates to a new and improved type of windshield wiper blade assembly wherein the wiping element may be removed from the superstructure for purposes of replacement, inspection, etc. In accordance with the present invention, the improved assembly comprises a wiper blade including an elongated flexible backing or flexor element which is cooperable with the blade superstructure, and particularly, an elongated connecting link which supports the assembly on the wiper arm. More specifically, the associated connecting link is formed with a pair of claw-like end portions which include diverging end portions that extend downwardly along the opposite sides of the flexor element and terminate in inwardly projecting flange portions adapted to slidably engage the underside of the flexor element. The flexor element is formed with an inwardly projecting recess or slot along one side thereof through which one of the flange portions of the associated connecting link may be moved, whereby to permit separation of the subassembly consisting of the blade and flexor element from the connecting link. A portion of the blade extends upwardly through an elongated opening in the flexor element and is formed with an integral resilient deformable stop element which is normally engaged with the end of the connecting link to resiliently resist relative longitudinal movement thereof with respect to the blade. When it is desired to effect separation of the subassembly consisting of the blade and flexor from the connecting link, the two assemblies are moved longitudinally relative to one another, whereby the end of the connecting link longitudinally deforms the stop element as the former moves toward the slot. At such time as the end section of the connecting link has moved longitudinally of the flexor element to a position where one of the flange portions thereof is in registry with the slot in the flexor element, the blade-flexor element subassembly may be conveniently removed from the connecting link for purposes of replacement and inspection, etc.

Accordingly, it is a general object of the present invention to provide a new and improved replaceable windshield wiper assembly.

It is a more particular object of the present invention to provide a new and improved windshield wiper assembly which includes means providing for convenient disassembly and replacement thereof.

It is still another object of the present invention to provide a new and improved windshield wiper assembly wherein a portion of the wiper blade per se is utilized to normally resiliently resist disassembly thereof from the associated superstructure.

It is still a further object of the present invention to provide a new and improved windshield wiper assembly of the above character which is of a simple design, is economical to manufacture and which will have a long and effective operational life.

Other objects and advantages of the present invention will become apparent from the following detailed description taken in conjunction with the accompanying drawings.

BRIEF DESCRIPTION OF THE DRAWINGS

FIG. 1 is a longitudinal side elevational view of the new and improved replaceable windshield wiper assembly of the present invention;

FIG. 2 is an enlarged perspective fragmentary view of a portion of the windshield wiper blade assembly and associated superstructure shown in FIG. 1;

FIG. 3 is a view similar to FIG. 2 and shows the relative portions thereof in a partially disassembled configuration;

FIG. 4 is another view similar to FIGS. 2 and 3 and shows components thereof in still another partially disassembled configuration;

FIG. 5 is a view similar to FIG. 4 and shows the connecting link of the superstructure in a disassembled relation with respect to the associated blade assembly, and FIG. 6 is a transverse cross-sectional view taken substantially along the line 6—6 of FIG. 3.

DESCRIPTION OF THE PREFERRED EMBODIMENT

Referring now in detail to the drawings and in particular to FIG. 1 thereof, a windshield wiper blade assembly 10, in accordance with one preferred embodiment of the present invention, is shown in operative association with a conventional wiper arm 12 having a terminal end portion 14 which is adapted to be secured by any suitable attachment clip or the like 16 to a support yoke or link 18. The link 18 may be of any construction well known in the art adapted to operatively support the assembly 10 and cause the same to continguously engage the associated windshield, as will be appreciated by those skilled in the art. As illustrated, the connecting link 18 comprises a pair of downwardly diverging sections 20 and 22 which have the outer terminal ends thereof provided with claw-like end portions 24 and 26 respectively. As will hereinafter be described in detail, the end portions 24, 26 are adapted to be removably secured to the associated blade assembly 10 in a manner so as to provide for convenient removal and replacement thereof.

With reference now in detail to the construction of the assembly 10, as shown in FIG. 6, the assembly 10 comprises a windshield wiper blade 28 which is fabricated of a resilient deformable material, such as rubber or the like and which comprises a central longitudinally extending body 30 that defines an elongated wiper lip 32 along the lower side thereof. Disposed above and co-extensive of the wiper body 30 is an enlarged head portion 34 which is integrally connected to the body 30 by means of a reduced thickness neck portion 36 having opposed sides 38 and 40 and which extends upwardly through an elongated central opening 42 formed in a backing strip of an elongated thin metallic flexor element 44. It will be appreciated by those skilled in the art that the blade 28 and flexor element 44 are fixedly secured to one another by having the head portion 34 threaded or otherwise inserted into the elongated opening 42, and due to the fact that the head portion 34 and body 30 are somewhat larger in cross-section than the opening 42, the flexor element 44 will be retained therebetween in the manner shown in FIG. 6, whereby to provide a unitized subassembly which may be easily removed and replaced when the lip portion 32 of the blade 28 becomes worn or for any other suitable reason.

In accordance with the present invention, the end portions 24, 26 of the connecting link 18 are each formed with downwardly tapered or diverging side sections 46 and 48, the terminal ends of which are formed with laterally inwardly projecting flange portions 50 and 52, as best seen in FIGS. 5 and 6. The lateral width between the lower ends of the side sections 46, 48 of each of the end portions 24, 26 is slightly larger than the lateral width of the flexor element 44 and head portion 34 of the associated blade 28; however, the flange portions 50, 52 are adapted to extend inwardly below and slidingly engage the underside of the flexor element 44 in the manner shown in FIG. 6. With this arrangement, it will be seen that the subassembly consisting of the blade 28 and flexor element 44 is adapted to slide longitudinally relative to the claw-like end portions 24, 26 of the connecting link 18 in order to provide for assembly and disassembly of the blade assembly 10, as will hereinafter be described.

Further in accordance with the present invention, a new and improved means is provided for detachably retaining the blade assembly 10 in a preselected operative position with respect to the superstructure consisting of the connecting link 18 and arm 12. As best seen in FIGS. 2 through 5, such retaining means comprises in part a resilient deformable stop element which is formed integrally of the blade 28 at a position directly above the head portion 34 thereof and adjacent one end of the blade assembly 10. The stop element 54 is disposed directly above and is cooperable with a generally rectangular shaped recess or slot 56 that is formed along one edge of the flexor element 44, as best seen in FIG. 5. The slot 56 is of the same general cross-sectional shape and size as the flange portion 50 associated with the side section 46 of the connecting link end portion 26. More particularly, the slot 56 is designed so as to have a longitudinal length L which is equal to or slightly larger than the length of the flange portion 50, whereby to enable the flange portion 50 to move freely upwardly and downwardly through the slot 56. The stop element 54 is formed with a laterally extending end face or surface 59 which is adapted for butting engagement with an end surface 62 of the connecting link end portion 26 in order to normally resist relative longitudinal movement between the connecting link 18 and the blade assembly 10; however, the stop element 54, by virtue of its resilient character, is adapted to deform slightly when relatively longitudinal opposed forces, such as are indicated by the arrows 64 and 66 in FIG. 3, are exerted against the assembly 10 and link 18 in order to permit the blade assembly 10 to be moved to a position wherein the flange portion 50 is in registry with the slot 56. When this occurs, a slightly upwardly directed force may be applied against the end section 26 of the connecting link 18, as indicated by the arrow 68 in FIG. 4, whereupon the end section 26 may be disengaged from the blade assembly 10, as will be described in connection with the overall operation of the present invention.

The foregoing subassembly or refill unit consisting of the blade 28 and flexor element 44 intended to be removably mounted on the superstructure consisting of the connecting link 18 and wiper arm 12 in the following manner:

Normally, the blade assembly 10 is operatively secured to the superstructure in the manner best shown in FIG. 1. At such time as it is desired to effect disassembly of the blade assembly 10 from the superstructure, i.e., from the connecting link 18, opposed forces are exerted in the direction of the arrows 64 and 66 against the connecting link 18 and blade assembly 10, whereby the blade assembly 10 will be moved longitudinally against the resistance of the element 54 from the position shown in FIG. 2 toward the position shown in FIG. 3. Continued exertion of the aforesaid forces results in the blade assembly 10 being moved to a longitudinal position wherein the flange portion 50 of the side section 46 moves into registry with the slot 56, as shown in FIG. 4. When this occurs, an upwardly directed force in the direction of the arrow 68 in FIG. 4 may be exerted against the connecting link 18, whereby the flange portion 50 will move upwardly out of the slot 56, resulting in disengagement of the end portion 26 of the connecting link 18 from the blade assembly 10. Thereafter, the entire blade assembly 10 may be bent slightly if necessary to effect longitudinal displacement of the end portion 70 thereof from the opposite end portion 24 of the connecting link 18 to effect complete disassembly of the blade assembly 10. At such time as it is desired to replace the blade assembly 10, the aforedescribed steps are merely reversed as will be appreciated by those skilled in the art.

It will be seen from the foregoing that the present invention provides a novel windshield wiper blade assembly wherein the blade 28 per se and associated flexor element 44 may be supplied as a separate commodity for replacement in existing appropriate superstructures, i.e. connecting links 18 and wiper arms 12. Accordingly, an existing windshield wiper assembly may be reconditioned without requiring replacement of the entire arm, or other portions of the superstructure thereof. A particular feature of the present invention resides in the fact that a portion of the resilient blade structure per se is utilized for removably retaining a blade assembly in operative connection with respect to the associated superstructure, with the result that no ancillary latch members or other retaining devices need be provided, thus minimizing production costs to the extreme. Still another feature of the present invention will be seen from the fact that the resilient character of the stop element 54 will positively retain the blade assembly 10 in its operative relationship to the associated superstructure, yet removal may be achieved with a simple manual manipulation of the component parts so that replacement of the blade assembly 10 may be rapidly effected with a minimum amount of time and effort being expended.

While it will be apparent that the preferred embodiment illustrated herein is well calculated to fulfill the objects above stated, it will be appreciated that the present invention is susceptible to modification, variation and change without departing from the scope of the invention.

What is claimed is:
1. In combination,
 a windshield wiper assembly including an elongated resilient wiper blade,
 a wiper superstructure including an attachment link for operatively supporting said assembly,
 a flexor element extending longitudinally of said blade and fixedly secured thereto, said attachment link normally being engaged with said flexor element at a first longitudinal position thereon for securing said assembly to said superstructure, with said assembly and said link being longitudinally movable relative to one another to where said link engages said flexor element at a second position longitudinally spaced from said first position and permitting disassembly of said blade assembly from said superstructure, and means comprising a resilient deformable element formed integrally of said blade for normally resisting longitudinal movement of said assembly relative to said link.

2. The combination as set forth in claim 1 wherein said attachment link comprises at least one end portion consisting of diverging end sections extending downwardly along the opposite sides of said flexor element and terminating in inwardly projecting flange sections adapted to sliding engagement with the underside of said flexor element.

3. The combination as set forth in claim 2 which includes means on said flexor element permitting disassembly of at least one of said end sections of said connecting link therefrom.

4. The combination as set forth in claim 3 wherein said means permitting disassembly of said connecting link end section from said flexor element comprises a recessed portion formed in one side of said flexor element and being of approximately the same cross-sectional size as one of said flange sections.

5. The combination as set forth in claim 4 wherein said blade comprises a longitudinally extending wiper lip portion, and upwardly projecting neck portion extending through a central opening formed in said flexor element, and an enlarged head portion disposed above said flexor element.

6. The combination as set forth in claim 5 wherein said means resisting longitudinal movement comprises a resilient upwardly projecting stop element formed integrally of said head portion of said blade and adapted for engagement with one end of said connecting link and being longitudinally deformable to permit said flange sections of said connecting link to move longitudinally of said flexor element to a position in registry with said slot and thereby permit disassembly of said blade assembly from said connecting link.

7. A separable windshield wiper blade assembly adapted for operative association with a wiper superstructure including a claw-like attachment link for operatively supporting said assembly, said assembly including an elongated resilient wiper blade, a flexor element extending longitudinally of said blade and fixedly secured thereto, said attachment link normally being engaged with said flexor element at a first longitudinal position thereon and being movable longitudinally of said flexor element to a position wherein said link engages said flexor element at a second position longitudinally spaced from said first position and permitting disassembly of said blade assembly from said superstructure, and means including a resilient deformable element secured to the wiper blade and separable therewith from the wiper superstructure for releasably resisting relative longitudinal movement between said blade assembly and said connecting link.

8. The invention as set forth in claim 7 wherein said resilient deformable element is formed integrally of said blade.

9. The invention as set forth in claim 7 wherein said attachment link comprises at least one end portion consisting of diverging end sections extending downwardly along the opposite sides of said flexor element and terminating in inwardly projecting flange sections adapted for sliding engagement with the underside of said flexor element.

10. The invention as set forth in claim 9 which includes means in said flexor element permitting disassembly of at least one of said end sections of said connecting link therefrom.

11. The invention as set forth in claim 10 wherein said means permitting disassembly of said connecting link end section from said flexor element comprises a recessed portion formed in one side of said flexor element and being of approximately the same cross-sectional size as one of said flange sections.

12. The invention as set forth in claim 11 wherein said blade comprises a longitudinally extending wiper lip portion, and upwardly projecting neck portion extending through a central opening formed in said flexor element, and an enlarged head portion disposed above said flexor element.

13. The invention as set forth in claim 12 which includes means formed integrally of said head portion of said blade for resisting longitudinal movement between said end section of said connecting link and said flexor element.

14. The invention as set forth in claim 13 wherein said means resisting longitudinal movement comprises a resilient upwardly projecting stop element formed integrally of said head portion of said blade and adapted for engagement with one end of said connecting link and being longitudinally deformable to permit said flange sections of said connecting link to move longitudinally of said flexor element to a position in registry with said slot and thereby permit disassembly of said blade assembly from said connecting link.

* * * * *